United States Patent [19]

Zipfel

[11] 4,245,456
[45] Jan. 20, 1981

[54] ROTARY LAWNMOWER WITH GRASS CLEARING MEANS

[76] Inventor: Heinz Zipfel, Steinmitzig 18, D-8630 Coburg, Fed. Rep. of Germany

[21] Appl. No.: 26,655

[22] Filed: Apr. 3, 1979

Related U.S. Application Data

[63] Continuation-in-part of Ser. No. 805,999, Jun. 13, 1977, abandoned.

[30] Foreign Application Priority Data

Jun. 16, 1977 [DE] Fed. Rep. of Germany ....... 2627167

[51] Int. Cl.³ .......................................... A01D 35/26
[52] U.S. Cl. ................... 56/12.8; 56/320.1; 56/320.2; 56/DIG. 1; 56/DIG. 18
[58] Field of Search ............ 56/12.8, 255, 320.1, 56/320.2, 202, 295, DIG. 18, DIG. 2

[56] References Cited

U.S. PATENT DOCUMENTS

| | | | |
|---|---|---|---|
| 2,931,156 | 4/1960 | Fulwider | 56/DIG. 18 |
| 3,648,446 | 3/1972 | Haapoja et al. | 56/320.2 |
| 3,680,295 | 8/1972 | Rutherford | 56/320.2 |

*Primary Examiner*—Jay N. Eskovitz
*Attorney, Agent, or Firm*—Alfred E. Miller

[57] ABSTRACT

A rotary lawnmower of the hovering air cushion type, or of conventional design, is provided with a grass clearing plate which is preferably mounted on the front of the mower and projects a distance therefrom whereby a part of the mower housing and the grass clearing plate together provide a loading surface for the cut grass. The mowing and cut grass clearing operations occur at the same time, thus eliminating a separate after treatment of the cut lawn.

14 Claims, 14 Drawing Figures

ROTARY LAWNMOWER WITH GRASS CLEARING MEANS

The present application is a continuation-in-part application of U.S. patent application Ser. No. 805,999 filed on June 13, 1977, now abandoned.

BACKGROUND OF THE INVENTION

Air cushion, hovering-type lawnmowers have long been known, for example U.S. Pat. Nos. 3,110,996, 3,756,336, 3,452,523. In these constructions the cutting blade rotates with a high, constant rate of revolution in order to seize the grass and then to cut or chop it up. Furthermore, the grass is repeatedly drawn into the cutting zone by the air back pressure of the mower air cushion, and cut up repeatedly until finally only a mulch of finely chopped up grass remains on the ground.

In connection with the above procedure, it is recommended that the lawn be mowed twice weekly, that is about every three days. If, in fact, this three day interval is exceeded, serious difficulties arise with the mowing procedure because the grass becomes too long and can no longer be completely chopped up, so that it becomes necessary to recut the grass. This after treatment is carried out by mowing the whole lawn surface once again with the air cushion lawnmower, or a conventional rotary mower, in order to further chop up the only partially cut grass. After that, the grass cuttings have to be raked away with a special sweeping machine or with a rake.

It can, thus, be seen that the use of the known air cushion lawnmower, because of the frequent mowing and/or because of the necessity to clear away the mown grass, is very time consuming.

It is well known that some wheeled lawnmowers are provided with a grass catching device, such as a grass receiving sack, so that in itself the mowing intervals could be lengthened but no basic improvement is achieved with this arrangement. This is because the mowing operation must be frequently interrupted in order to empty the grass receiving device. In addition, the connecting channel between the lawnmower and the grass receiving device easily blocks up, especially with damp grass. Moreover, the handling of such wheeled lawnmowers equipped with grass receiving devices is unwieldy and laborious.

Furthermore, in the use of the known air cushion lawnmowers there are additional difficulties in that the blunt striking or chopping blade is sharpened for only about 4 cm at the ends thereof and the constant rate of revolution of the blade does not allow a perfect mowing for all kinds of lawns and for all types of lawn conditions, such as, hard, soft, thin, thick, long or short grass, nor for all types of weather conditions, such as, damp or wet grass. The individual problems herein set forth for air cushion lawnmowers also occur basically with respect to wheeled lawnmowers.

It is an object of the invention, in view of the above mentioned problems, to provide a rotary lawnmower, the use of which avoids a time consuming after treatment of the mown lawn surface, even in the case of a lawn which is in itself difficult to mow, in particular, a lawn which has not been mown for a long time. The end result is a more effective mowing of the lawn.

Another object of the present invention is to provide at least one grass clearing plate on the lawnmower housing. In a particularly advantageous embodiment, the grass clearing plate protrudes at a distance from the forward frontal side of the mower housing, in the direction of the working movement of the mower, such that the housing surface between the edge of the housing and the grass clearing plate forms a loading surface for the cut grass.

The substantial advance achieved by the present invention is that the mowing and grass clearing occur at the same time so that a separate after treatment of the cut lawn, especially by raking up or use of a sweeping machine, is unnecessary.

The basic construction of the invention envisions a single grass clearing plate that is detachably mounted, as required, on the front side or rear side of the lawnmower. The direction of movement chosen for the air cushion lawnmower depends on the grass itself and the weather conditions. However, with very wet grass, thin and fine grass, or in dry weather conditions, the lawnmower is moved backwards, or in the pulling direction, whereas with thick and high grass, it is moved forwards or in the pushing direction. In the case of an air cushion lawnmower, a single grass clearing plate is sufficient for all types of lawn and weather conditions, without it having to be transferred between the front and rear side of the lawnmower housing. Moreover, it is preferable to provide means for mounting the pushing handle on both sides of the lawnmower housing to thereby adjustably fasten the pushing handle in the length direction of the lawnmower.

In the case of mowing wet, thin and light types of grass, the pushing handle is mounted on the front half of the lawnmower housing, so that the hovering air cushion lawnmower is automatically lightly pressed forwards and can better take up the grass swaths lying lower on the ground, whereas for dry and very long grass, the pushing handle is secured on the rear half of the housing.

Mowing and grass clearing can thus, with this embodiment of the invention, be achieved under all conditions, in a single direction, if merely the fastening of the pushing handle is varied in the length direction of the housing.

Pursuant to the teachings of the present invention, it is now possible to mow the lawn, at much longer time intervals, for example of nine days, indeed even about three weeks, without a time consuming after treatment of the lawn being necessary.

With the grass clearing plate provided according to the present invention, it is appropriate, when mowing a given lawn surface in a path of concentric rectangles from the outside towards the inside, and during mowing on any particular turn of any rectangle at the same time to clear or push the grass swaths lying on the immediately adjacent outer rectangle automatically to at least one of the diagonals of the lawn surface. Thus, on completion of mowing, one or two crossing diagonals of grass swaths remain, which are then pushed together by the lawnmower with its grass clearing plate to provide a single pile of grass clippings which can be transported away in the conventional manner. It will be evident that an appreciable time saving can be achieved by the present construction so that now only about a third of the time previously needed to mow a lawn is required.

Surprisingly, it has been found that the clearing away of the mown grass is further facilitated if the grass pile formed by the pushing and clearing up process with the grass clearing plate according to the invention cling together rather firmly, which can be attributed to the unordered, random tangle or felting of the cut grass clippings in the individual piles.

It is preferred to construct the grass clearing plate integrally with the lawnmower housing, for example, of plastic. The grass clearing plate can, however, also be detachably fastened to the lawnmower housing, in particular for subsequent mounting on conventional lawnmowers; but also on lawnmowers to be newly manufactured. Furthermore, the grass clearing plate is adapted, in a simple manner, to be adjustable by means of an adjustable detachable fastening on the lawnmower housing according to the type and condition of the lawn, and also according to weather conditions.

The collection of the cut grass is facilitated if the lawnmower housing adjacent to the grass clearing plate has a flattened, smooth edge, bent slightly downwards, which extends over at least a part of the width of the housing. In order to accomplish this, it is appropriate that the flattened, smooth edge on the front or pushing direction side of the lawnmower extends over only about one third of the width of the housing to the grass ejection side.

In the above manner, as has been shown in practical use, reliable mowing can also be achieved with differing types of lawn and ground formations, as well as wet or dry, thin or hard grass. Moreover, by flattening of the edge over only about one-third of the width of the housing, seizing up of the lawnmower in dry weather, as well as with hard and thick grass, is almost completely eliminated.

It is preferable that the length of the smooth edge, flattened over the full width of the housing, on the rear or pulling direction side of the lawnmower, is approximately 10 cm, so that this edge serves at the same time as a safety stand-off device.

It is to be understood, however, that, with pushing handles mounted so that they can be adjusted lengthwise, the grass clearing plate on the rear side is entirely dispensed with.

In practice, it has been found to be particularly advantageous if the grass clearing plate, as viewed in the direction of movement of the lawnmower, is approximately crescent-shaped and concave relative to the lawnmower housing.

Clearing the grass by means of the grass clearing plate is facilitated by a rate of revolution adjuster for the stepwise adjustment of the rate of revolution of the blade of the lawnmower. By the stepwise setting of the rate of revolution, especially with air cushion lawnmowers, an adjustment for all lawn types and conditions is achieved, such as hard, soft, thin, thick, long or short grass, and all weather conditions, such as damp or wet grass. Thus, the grass is not simply chopped up or squashed, but is cut off and can be taken by means of the grass clearing plate which is provided in accordance with the teachings of the invention. For example, the rate of revolution of the blade should be particularly low with thin grass, clover and other weeds, in order not to chop up the grass, but to cut it off.

It should be noted that the rate of revolution of the blade should be as low as possible, while still maintaining the air cushion effect, preferably about 3200 rpm, so that the grass is not chopped up excessively but rather is ejected and left lying in a bulky form whereby it can be caught and stored by the grass clearing plate. In other words, if the air cushion lawnmower blade is driven with a high rate of revolution, the grass is drawn into the air funnel more strongly than with a lower rate of revolution, so that it is then more squashed and bruised. This is in contrast to the grass receiving devices of wheeled lawnmowers, where the grass is cut off at the blade point and immediately blown into the grass receiving device.

The present construction promotes cutting instead of chopping up of the grass. This is achieved since the rotary blade is sharpened at its free end over at least one third of the half blade length, and in particular has, on both sides, a cutting edge from the end to its pivot, in the blade rotation direction.

The rotary lawnmower according to the invention can, above all, function as an air cushion lawnmower, and in particular in its preferred embodiment, has a rate of revolution adjustment and/or at least a partially continuous cutting edge on each side of the blade to be used in any weather, especially wet weather. Moreover, on account of the cutting instead of the former chopping up, the load on the drive motor is less, which not only increases its life but also, in the case of an internal combustion engine, considerably reduces its fuel consumption, so that it causes appreciably less pollution of the environment on account of the corresponding reduction in the exhaust gases.

In order that the invention will be more clearly understood, it will now be disclosed in greater detail with reference to the accompanying drawings, in which:

FIGS. 12a and 12b are similar to the construction illustrated in FIG. 11, however being provided with a lawnmower having two push handles fastened on each side, FIG. 12a illustrating the fastening of the push handle for mowing dry grass while FIG. 12b shows a push handle that is mounted and secured for wet grass.

DESCRIPTION OF THE PREFERRED EMBODIMENT

Figure 1:
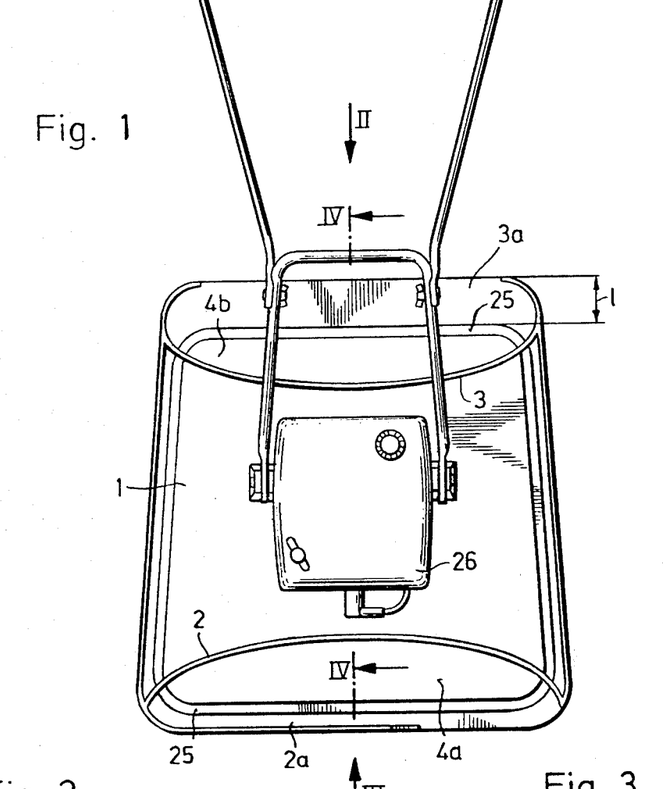
FIG. 1 is a top plan view of an air cushion, hovering type of lawnmower provided with a front and rear grass clearing plate constructed in accordance with the teachings of the present invention.
Figure 2:
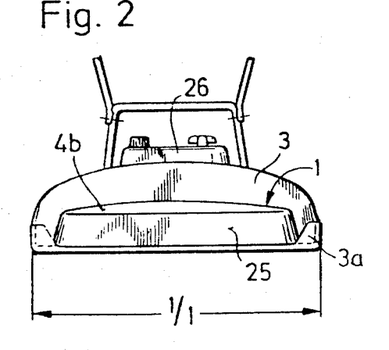
FIG. 2 is a rear elevation view of the lawnmower as seen in the direction of the arrow II of FIG. 1.
Figure 3:
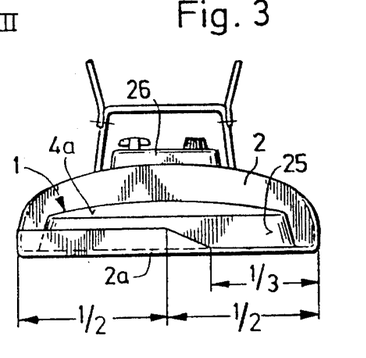
FIG. 3 shows a front elevation view of the lawnmower of FIG. 1, taken in the direction of arrow III thereof.

The air cushion, hovering type lawnmower shown in FIGS. 1-4 is provided with a front grass clearing plate 2 as well as a rear grass clearing plate 3. Both of the plates 2 and 3 are integral with the housing 1. This construction can be clearly seen in FIG. 4. Referring again to FIG. 4, it will be noted that the front horizontal flange 2a of the housing 1 is flat and is provided with an upstanding portion 2b, both of which extend over about one third of the width of the housing, as seen in FIGS. 1 and 3.

Figure 4:
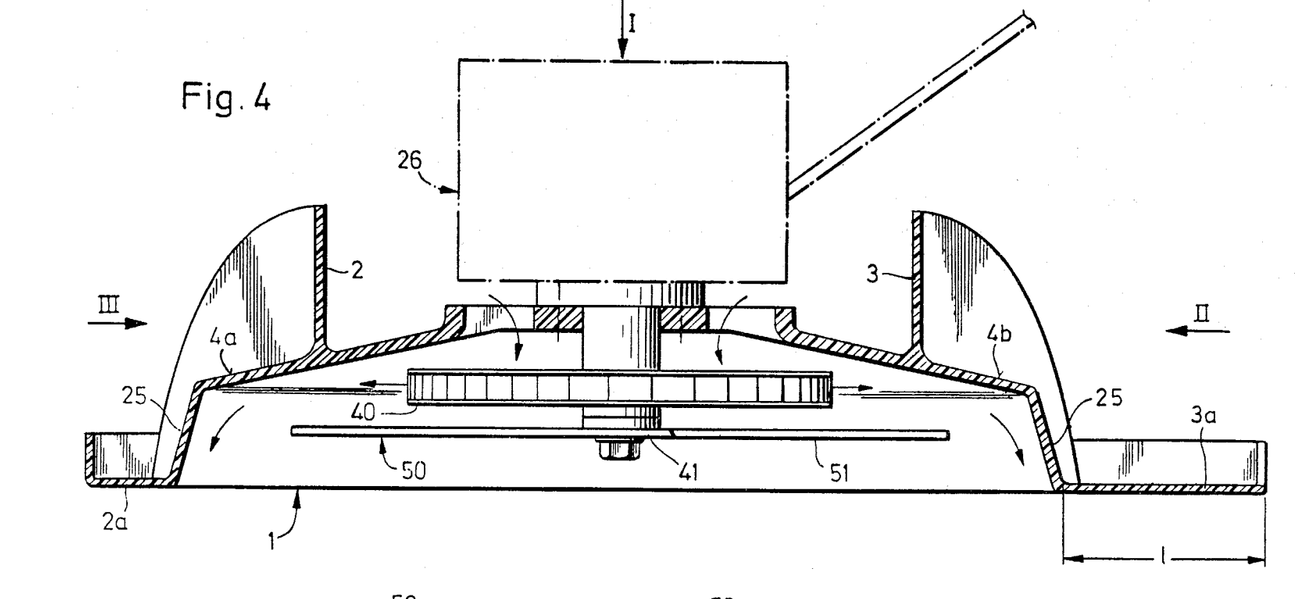
FIG. 4 is an enlarged sectional view of the lawnmower taken along the lines IV—IV of FIG. 1.

As seen in FIG. 2, on the opposite or rear side thereof there is a rear flange 3a which is flat and the length of which is greater than that of the front edge 2a of the housing 1, as seen in FIG. 4. It will be noted that the flange 3a is drawn downwardly over the entire width, as seen in FIGS. 1, 2 and 4, respectively. Furthermore, the associated grass clearing plate 3 is so constructed and arranged to be a mirror image of the grass clearing plate 2.

It will be evident that the grass clearing plates 2 and 3 each protrude from the surface of the housing 1 at a distance from the forward front side in the specific and particular direction of motion of the lawnmower so that the surface of the housing between the front flanges 2a and 3a in the particular direction of motion in each case forms a loading surface 4a and 4b for the cut grass. This loading surface is sloped in a slightly downward direction and emerges into a substantially vertical housing section 25, as seen in FIG. 4, with the particular front flanges 2a or 3a, respectively of the housing 1.

The function of the mower in operation is as follows, when viewing the mower from above when operating the same, as in FIG. 1: The mower blade rotates in a clockwise direction; as the grass is cut it leaves the blade and forms a string or pile on the right-hand side of the mower between the tip of the mower blade and the inner wall of the adjacent mower housing. A small part of the grass is thrown out under the mower housing to the right-hand side of the mower, but the major part of the cut grass drops on the uncut grass that remains between the tip of the blade and the inner wall of the mower housing. Thereafter, the rear portion of the rim will pass over the string or pile of grass. Thus, on the next square pattern of mowing the grass, the mower is moved to the right so that it is in a position whereby the string or pile of cut grass appears in the front of the mower, but on the left side thereof and the loading surface 4a serves as a grass collecting plate, which moves forward about 5 mms. above the ground, but under the string of grass. Thus, the forward motion of the mower causes the string to be forced up on the loading surface of the grass collecting plate.

Figure 8:
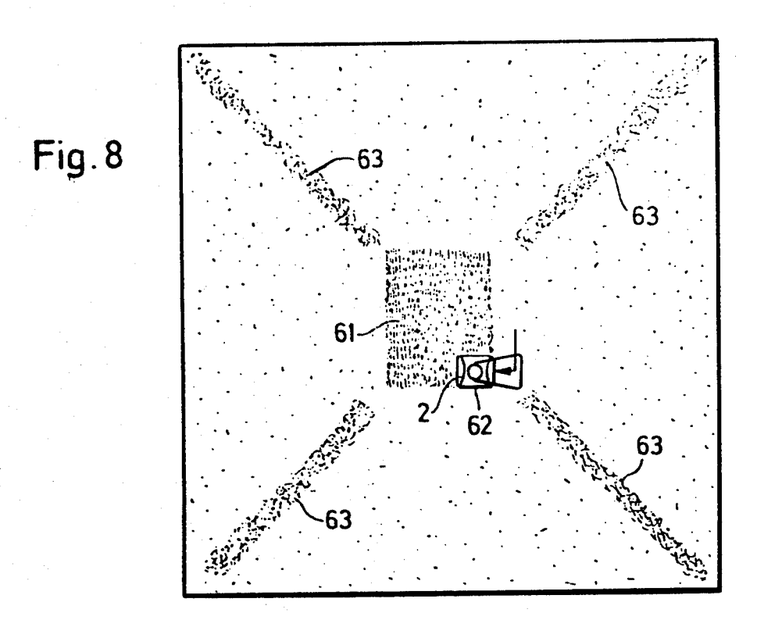
FIGS. 8 and 9 are diagrammatic views showing the uses of an air cushion lawnmower for simultaneously cutting and clearing the grass clippings, or for subsequent clearing up of the grass swaths to a single pile of grass.
Figure 9:
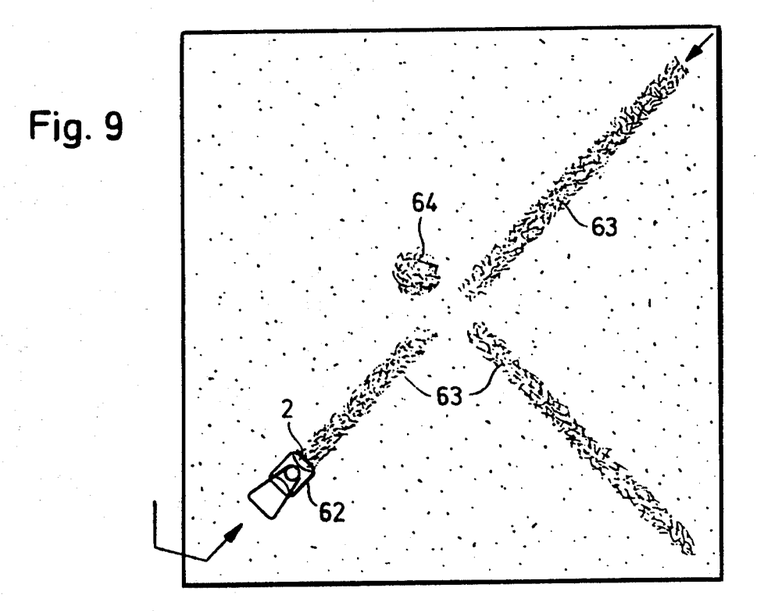

It is apparent from a study of FIGS. 8 and 9 that the grass clearing plates on the mower cannot accommodate all the cut grass thereon, therefore the cut grass pushed up on the collecting plate, when the lawnmower is guided in the forward or rearward direction, can be laid off in heaps in one or several corners of the square-shaped pattern of the uncut grass, but adjacent to and remaining on the cut grass area. The long strings or piles of grass, as seen in FIGS. 8 and 9, can be easily pushed together to a central heap which can be picked up subsequently, and disposed of.

Figure 5:
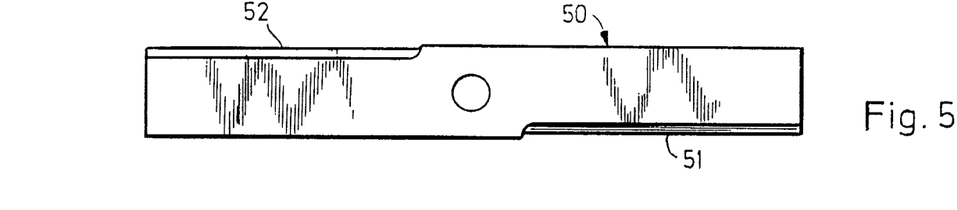
FIG. 5 is a plan view of the cutter blade of the lawnmower shown in FIG. 4.

It should be further noted that the gasoline tank and associated motor of the air cushion lawnmower are schematically indicated with the reference numeral 26 in FIGS. 1-4. Furthermore, FIG. 4 shows a fan 40 that is of a known type used in air cushion, hovering type lawnmowers which draws in air in the direction of the arrows through the upper orifices 27 and into the interior of the housing 1. The fan 40 is separated from the rotary blades 50 by means of a spacer washer 41. As seen in FIG. 5, the rotary blade 50 has continuous cutting edges 51 and 52 operable in the direction of rotation.

Figure 6:
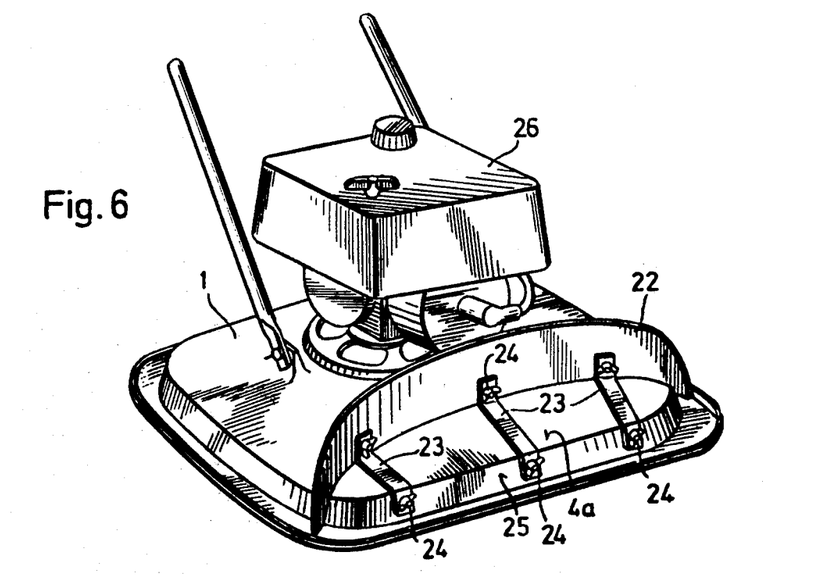
FIG. 6 is a perspective view of another embodiment of the invention, showing an air cushion lawnmower having a grass clearing plate.
Figure 7:
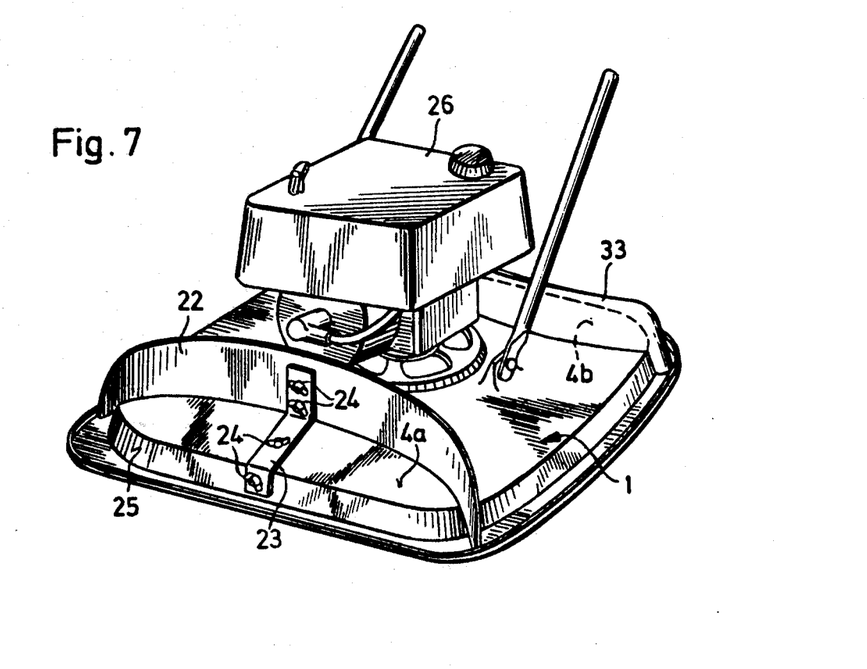
FIG. 7 is a perspective view of a further embodiment of the present invention, showing an air cushion lawnmower having two grass clearing plates.

While the embodiments of the invention illustrated in FIGS. 1-4 the grass clearing plates 2 and 3 are constructed integrally with the housing 1 of the lawnmower, in FIGS. 6 and 7 the grass clearing plates are detachably mounted on the housing, and are particularly suitable for mounting on existing conventional air cushion lawnmowers.

Referring to FIG. 6, the air cushion, hovering type lawnmower has a grass clearing plate 22 detachably mounted on the front side of its housing, and in the direction of movement has an approximately crescent-shaped configuration and is also concave. The detachable mounting of the grass clearing plate 22 is carried out by means of brackets 23 having opposite ends bent in opposite directions. Each of the brackets 23 is secured by means of wing nuts 24 in which the lower bent ends are secured to the substantially vertical housing portion 25.

Referring now to FIG. 7, which is somewhat similar to the embodiment disclosed in FIG. 6, a further grass clearing plate 33 is shown detachably mounted on the rear side of the air cushion lawnmower by means of a bracket 23 (not shown). In addition, however, the first grass clearing plate 22 is mounted by means of bracket 23 having more wing nuts 24 than that shown on FIG. 6.

It should be evident that the detachable mountings of the grass clearing plates on the lawnmower housing 1, as illustrated in FIGS. 6 and 7, may be substituted for other types of attachment means which will achieve the desired function. Thus, the grass clearing plates may be mounted by means of a multipart height adjustment rack arrangement, or a rapid coupling, such as a bayonet fastening arrangement. It is desired to point out that the use of grass clearing plates on conventional air cushion lawnmowers results in a more desirable structure.

Referring now to FIGS. 8 and 9, in which a lawn surface is mowed with an air cushion, hovering type lawnmower 62, the lawnmower mows the grass area in a concentric rectangular pattern from outside inwardly on successive right angle turns so that the cut grass is ejected into the section 61 of the lawn surface which is uncut, and rectangular grass swaths are formed, as can be seen from the illustration in the center of FIG. 8. The grass swaths ejected during mowing onto the proceeding rectangular turn are pushed or cleared during mowing on the following rectangular turn by means of the left hand side of the grass clearing plate 2 mounted on the front of the lawnmower housing 1 up to the next turning or diagonal, and the grass clippings are left at that location. The accumulated grass is left lying in that location so that finally only two (with normal grass) or four diagonal grass swaths 62 (with normally thick and high grass) remain. As seen in FIG. 8, these grass accumulations can be very quickly pushed together with the grass clearing plate into two or four small grass piles or heaps 64, as particularly shown in FIG. 9. Thus, as seen by the arrows in FIG. 9, the grass is mown from the outside inwardly and the accumulated grass piles 64 can then be transported away in a conventional manner, for example, by a wheelbarrow.

Figure 10:
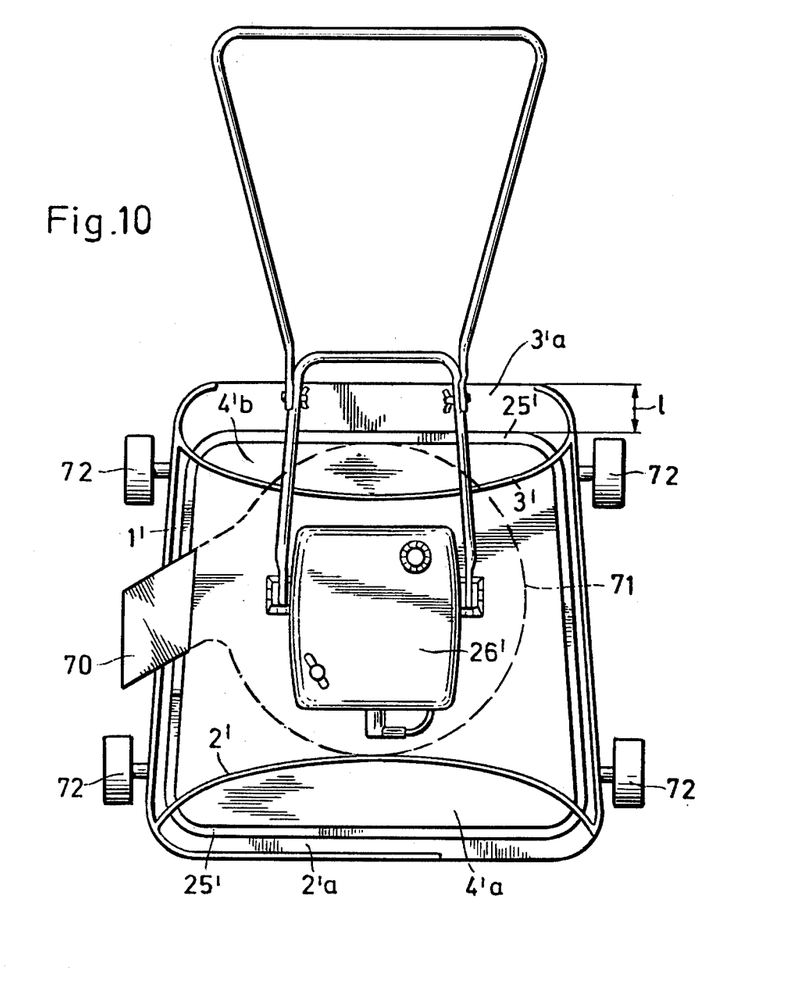
FIG. 10 is a top plan view of a wheeled lawnmower having both a front and rear grass clearing plate.

FIG. 10 shows a conventional wheeled lawnmower with two grass clearing plates 2′ and 3′ constructed in accordance with the teachings of the present invention. Moreover, since the wheeled lawnmower of FIG. 10 conforms basically with the air cushion lawnmower of FIG. 1, the same reference numerals are applied for corresponding parts, however, with the addition of a "′". As is common in most wheeled lawnmowers, there is a sideway grass ejection port 70 which is a continuation of the circular housing 71 as shown in dotted lines. Furthermore, the housing part 71 accommodates the usual rotary blade (not shown) for cutting the grass and guiding the same out through the ejection port 70. The housing 71 is provided with four wheels 72 as illustrated.

Figure 11:
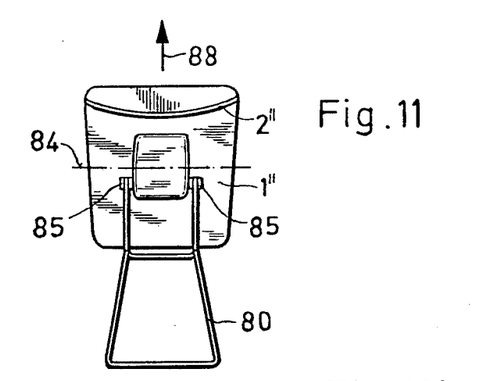
FIG. 11 is a reduced top plan view of an air cushion lawnmower, having only one push handle fastened on each side of said lawnmower housing.

Referring to FIG. 11 in which a lawnmower housing 1″ is shown having a push handle 80 and a single grass clearing plate 2″ corresponding to plate 2 shown in FIG. 1. Moreover, on each side of the lawnmower housing 1″ is located a mounting 85 for the push handle 80. The center of gravity of the lawnmower is indicated by the dashed line 84 and therefore it is clear that the push handle mountings 85 lie in the rear half of the lawnmower housing 1″ with respect to the pushing direction 88, and this particular mounting position is particularly favorable for dry and extremely long grass.

Figure 12A:
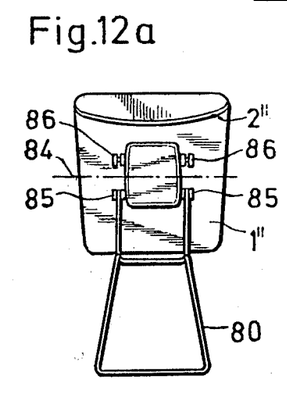
Figure 12B:
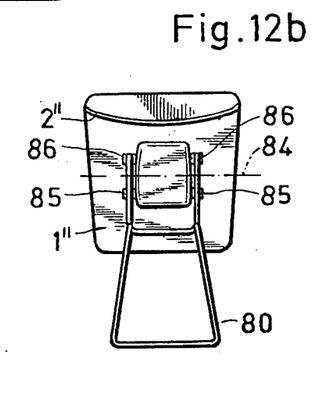

A further push handle 80 with a handle mounting 86 is shown in FIGS. 12a and 12b on each side of the housing 1″. It will be noted that this particular mounting lies in a position which is in the front half of the housing 1″. This particular mounting permits one to easily mow wet, thin and light grass without having to turn 180°. Thus, if wet, thin and light grass is to be mown, push handle 80 is merely transferred from the mountings 85 to the mountings 86 without having to turn the lawnmower around. Another advantage is achieved by having only one grass clearing plate 2″ whereas the embodiment of FIG. 1 with the push handle that is non-adjustable requires two grass clearing plates 2 and 3 respectively. In addition, it should be observed that by fastening the pushing handle 80 on the mountings 86, the hovering, air cushion lawnmower will, in fact, be pressed slightly forward in mowing so that the grass swaths lying lower on the ground will be more easily taken up.

Figure 13:
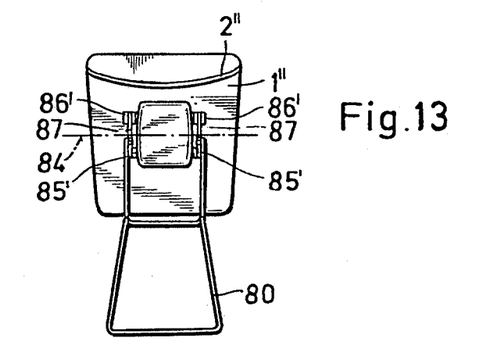
FIG. 13 shows a lawnmower having a continuously adjustable pushing handle secured on each side of the lawnmower housing.

FIG. 13 shows another embodiment of the invention somewhat similar to that shown in FIGS. 12a and 12b, however, having an additional round member 87 on each side of the housing 1″ which connects two mountings 85′ and 86′ to each other. Thus, the push handle 80 can be moved along the round piece 87 so that by continuous adjustment, the appropriate optimum working point can be selected for the grass to be mown. The securement of the push handle 80 on the round member 87 can be carried out by, for example, a large winged nut (not shown).

It should be evident that the push handle 80 can be cast integrally with the lawnmower housing 1″. However, the handle may be also mounted subsequently on the housing without undue expense.

A further construction is possible under the teachings of the present invention in which the grass clearing plate can be mounted on the front end according to the particular direction of movement of the lawnmower so as to project toward that side which is facing the surface of the lawn that has already been mown. In this particular case, sheet metal can also be bent slightly backward, as viewed in the direction of the movement of the lawnmower, at its free end which projects over the lawnmower housing so that the cut grass which is pushed up on the grass clearing plate that is shaped in this way is led away outwards thereupon during its movement and remains lying in the form of a grass swath at a distance sideways from the path of the lawnmower. A spring arrangement, such as a floating axle, can be provided in connection with a cradle for the grass clearing plate mounted thereon in order to maintain the height from the ground of such a grass clearing plate, which is mounted sideways on a rotary mower, and always at a constant value.

Referring to FIG. 10, again, a variant of this particular embodiment can be an air cushion mower having an under carriage and wheels which eject grass through an opening on the mower housing and which possess a grass clearing plate according to the invention in front of the rear wheel on the side facing the cleared lawn surface. In this particular construction and arrangement, the air flow is not utilized to form an air cushion but is used for blowing away the cut grass through an opening formed by a channel on the lower housing. Furthermore, in this particular arrangement, the ejector port provided for the opening and the ejector channel would not be directed diagonally forwards in the direction of movement, as is the case in FIG. 10, but backwards if the direction of rotation of blade is to the right.

It is desired to point out that the sound level of the rotary lawnmower constructed in accordance with the present invention and operating at 3100 to 3300 rpm lies well below the specified environmentally accepted standards.

What is claimed is:

1. A rotary lawnmower provided with a housing having an outer surface and rotary blade therein, said rotary blade having at least one tip for cutting grass, said grass cut by said blade forming an accumulation between the tip of said rotary blade and an inner wall of the right-hand side of the housing as viewed from above, said housing having a portion extending at least partially below the level of the tip of said blade which comprises at least one grass clearing plate located on the outer housing surface and in the front thereof, viewed in the direction of movement of said lawnmower, for collecting said accumulated cut grass on a part of said outer housing surface remote from said inner wall upon a subsequent movement of the lawnmower to directly engage said accumulation by said grass clearing plate.

2. A lawnmower as claimed in claim 1 wherein said outer housing is provided with a forward front part and wherein said grass clearing plate projects upwardly from said outer housing surface at a distance from said forward front part, viewed in the direction of movement, of said lawnmower such that the housing outer surface between the front of said housing and said grass clearing plate forms a loading surface area for said cut grass.

3. A lawnmower as claimed in claim 1 wherein said grass clearing plate is integral with said lawnmower housing.

4. A lawnmower as claimed in claim 1 wherein said grass clearing plate is detachably mounted on said lawnmower housing.

5. A lawnmower as claimed in claim 1 wherein said lawnmower housing adjacent to said grass clearing plate is provided with a flattened, slightly downward sloping smooth edge which extends over at least part of the width of said housing.

6. A lawnmower as claimed in claim 5 wherein said means for ejecting cut grass is on one side of the housing constituting said grass ejection side, and said flattened smooth edge extends over about a third of the width of said housing adjacent to said grass ejection side.

7. A lawnmower as claimed in claim 5 wherein on the rear side of said housing the length of the smooth edge thereof is flattened over the full width of said housing and equals approximately 10 cm on said rear side of the housing of said lawnmower.

8. A lawnmower as claimed in claim 1 wherein said grass clearing plate, viewed in the direction of movement of said lawnmower, is substantially crescent-shaped and concave in said direction of movement.

9. A lawnmower as claimed in claim 1 which is wheeless and elevated from the ground by means of an air cushion, further comprising a push handle, and means on each side of said housing for mounting said handle so that the latter is adjustable in the length direction of said lawnmower housing.

10. A lawnmower as claimed in claim 9 further comprising two spaced pairs of push handle mountings on both sides of said lawnmower housing which are located on opposite sides of the center of gravity line of said lawnmower.

11. A lawnmower as claimed in claim 10 further comprising a round member connecting each adjacent push handle mounting, said push handle being mounted on said round member to thereby be capable of continuously adjusting the position of said handle to selected fixed positions.

12. A lawnmower as claimed in claim 1 wherein the rate of revolution of said lawnmower blade is approximately 3,000 rpm.

13. A lawnmower as claimed in claim 1 wherein said rotary blade is sharpened on each free end over at least one third of each half blade length.

14. A lawnmower as claimed in claim 13 wherein said rotary blade is provided with a pivot for rotation thereabout and each side of the blade that is sharpened has a continuous cutting edge in the blade rotation direction from its pivot to its free end.

* * * * *